O. L. PICKARD.
ATTACHMENT FOR AEROPLANES.
APPLICATION FILED DEC. 1, 1910.
1,017,998.
Patented Feb. 20, 1912.
2 SHEETS—SHEET 1.
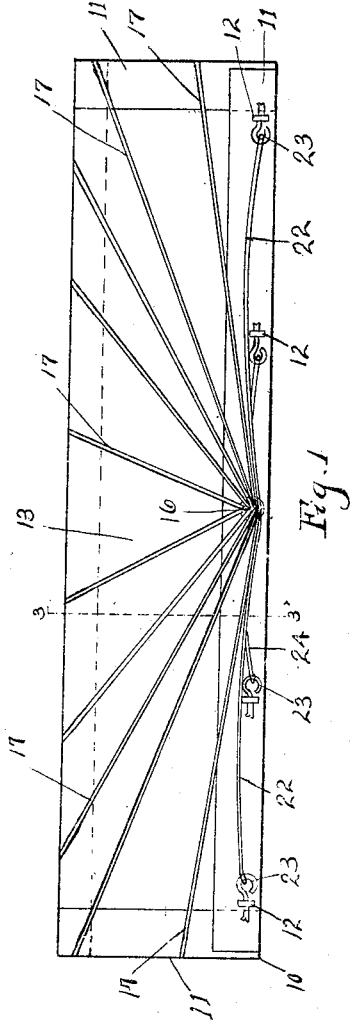
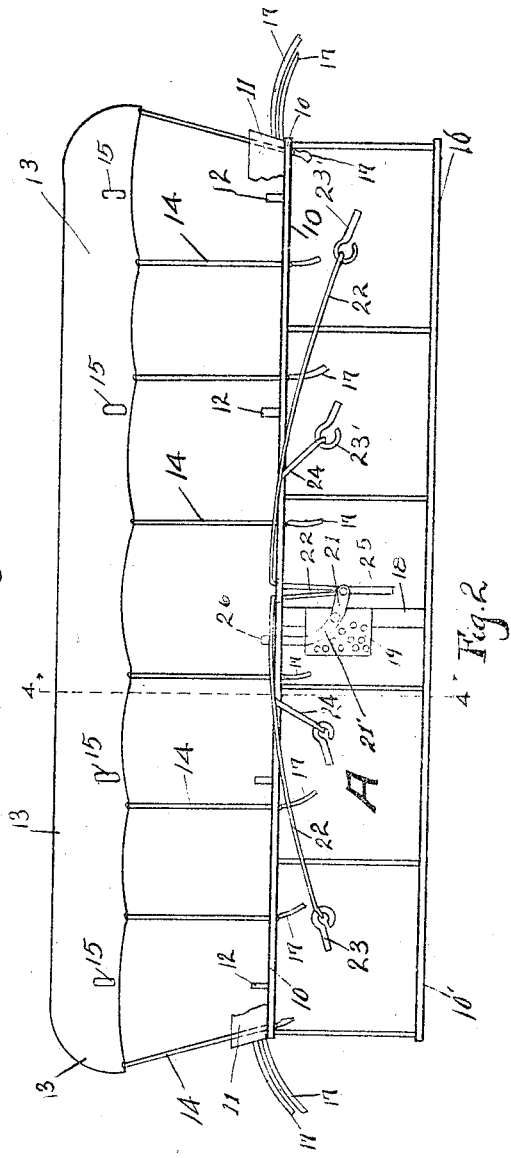
Witnesses
Dennis Dalton
A. L. Phelps
Inventor
Orson L. Pickard
By C. C. Shepherd
Attorney

O. L. PICKARD.
ATTACHMENT FOR AEROPLANES.
APPLICATION FILED DEC. 1, 1910.

1,017,998.

Patented Feb. 20, 1912.
2 SHEETS—SHEET 2.

Witnesses
Dennis Dalton
A. L. Phelps

Inventor
Orson L. Pickard

By
C. Shepherd
Attorney

UNITED STATES PATENT OFFICE.

ORSON L. PICKARD, OF COLUMBUS, OHIO.

ATTACHMENT FOR AEROPLANES.

1,017,998.  Specification of Letters Patent.  Patented Feb. 20, 1912.

Application filed December 1, 1910. Serial No. 595,058.

*To all whom it may concern:*

Be it known that I, ORSON L. PICKARD, a citizen of the United States, residing at Columbus, in the county of Franklin and State of Ohio, have invented certain new and useful Improvements in Attachments for Aeroplanes, of which the following is a specification.

This invention relates to attachments for aeroplanes and is designed to construct a safety device which, should any accident disable the motors or engines of an aeroplane, thereby causing the same to take a sudden fall, said fall may be arrested and all danger to the occupants and to the plane be eliminated.

It also contemplates the construction of a safety device which will readily operate, not being dependent upon the angle at which the aeroplane is traveling or upon the angle at which the same falls.

The operation of the safety device forming the subject matter of the present invention, is absolutely certain whether the aeroplane falls on end, tilts forwardly or rearwardly.

The present invention comprises a parachute carried by the upper plane of a biplane or by the single plane of a monoplane, in such a manner that the same does not interfere with the movement of the machine, but which may readily be released in an infinitely small period of time and is sufficiently quick acting to arrest the fall of the plane no matter at what distance the same is from the ground.

With the above objects and others of a similar nature in view, the invention consists in the construction, combination and arrangement of parts set forth in and falling within scope of the appended claims.

Figure 3:
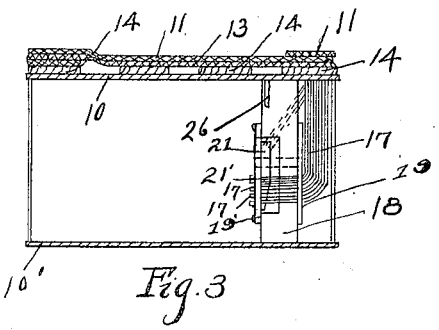
Figure 4:
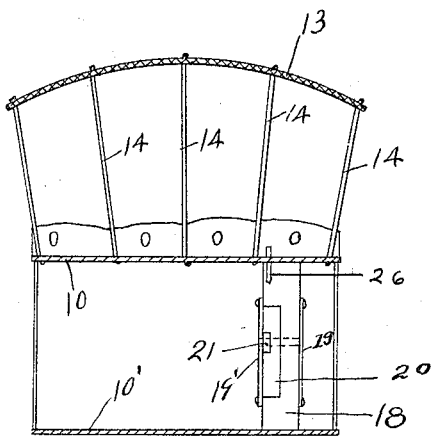

In the accompanying drawings—Figure 1 is a top plan view of a biplane illustrating the present invention attached thereto, but in its inoperative position, Fig. 2 is a front elevation of a biplane illustrating the present invention in its operative position, Fig. 3 is a section taken on line 3—3 of Fig. 1, illustrating the parachute releasing mechanism, and, Fig. 4 is a similar view taken on line 4—4 of Fig. 2.

The safety attachment for biplanes forming the subject matter of the present invention, comprises a parachute attached to the upper planes of a biplane or the single plane of a monoplane, in such a manner that said parachute rests flush with and parallel to the plane to which it is attached. The forward edge and ends of the parachute are retained in contact with the forward edge and ends of the plane to which it is attached by strips of canvas under which the edges of the parachute above referred to are placed, thereby preventing the wind caused by the ordinary movement of the aeroplane to work in under the parachute and raise the same. A series of ropes or cords are secured along the rear edge and ends of the plane to which the parachute is attached and extend over the body of the parachute to a central point in the forward edge of the plane, thereby retaining the body of the parachute in constant engagement with the plane. These ropes are secured as will hereinafter be more fully described and coöperate with the mechanism which sever the same and permit the wind to blow the parachute from engagement with the plane. The means for releasing or severing said ropes, operates a mechanism whereby the strip of canvas retaining the forward edge of the parachute in contact with the plane is released and at the same time forces the forward edge of the parachute outwardly in order that the wind or air may circulate under said parachute and cause the same to rise and perform the function for which it is designed.

Reference being had more particularly to the drawings, A indicates an aeroplane of the biplane type, being formed of the upper plane 10 and the lower plane 10'. The upper plane 10 is provided along its forward edge with a strip of canvas 11 through which projects the eyes 12. The parachute canvas 13 is secured to the upper plane 10 by the supporting ropes 14 which when the parachute is resting flush with the plane, are coiled under the same. The edges of the parachute are provided with the openings 15, the openings in the forward edge of which being arranged so as to receive the eyes 12, the forward edge of the parachute being retained between the strip of canvas 11 and the plane. A central opening 16 is provided in the forward edge of the parachute through which projects the terminals of the retaining ropes and the releasing mechanisms, as will be hereinafter more fully described. The strips of canvas 11 located at the ends of the upper plane are adapted to secure the ends of the parachute to said planes and prevent the air or wind from entering between the planes of the parachute and forcing the latter upwardly.

A series of retaining ropes or cords 17 are secured to the ends and rear edge of the plane and are adapted to pierce holes formed in the rear edge and ends of the parachute and in the canvas strips 11 located at the ends of the planes, said ropes converging to a central point and piercing the opening 16 centrally located in the forward edge of the parachute, the strip 11 located along the forward edge of the plane and the forward edge of the plane extending downwardly adjacent to the side of the operator. In order to provide a means of securing these ropes which bear over the upper surface of the body of the parachute and retain the same in an inoperative position, securely adjacent to the operator, but at the same time provide for their ready release, a bar 18 is interposed between the upper and lower planes 10 and 10' respectively and is provided with the plates 19 and 19' on each side thereof. The plate 19' covers a depression 20 formed in the bar in which a bell crank 21 is pivoted, said bell crank being provided with a knife portion 21' which operates flush against the surface of the plate 19'. The cords 17 pierce the plates 19 and 19' successively and are knotted against the outer surface of the plate 19'. From this construction it will be understood that upon moving the knife 21' upwardly, the cords will be sheared or cut, thereby permitting the same to fall free and the parachute 13 to rise.

A rope 22 extends longitudinally on each side of the opening 16 and carries at its terminal the split pins 23 which enter the eyes 12 located at each terminal of the forward edge of the plane. The ropes 23 carry the branches 24 which likewise carry the split pins 23' which enter the eyes 12 intermediate of the length of the plane. These split pins retain the canvas strip 11 located along the forward edge of the plane 10 against the parachute and readily lock the same in a position to prevent displacement thereof by the air currents. The terminals of the ropes 22 pass through the opening 16 and are secured to the inner terminal of the bell crank 21 which also carries the operating rod 25. From this construction, it will readily be understood that when a pull is exerted on the rod 25, the knife 21' will travel upwardly shearing or cutting the cords 17, thereby permitting the same to fall loose. This movement also exerts a pull on the cords 22 which removes the split pins 23 and 23' from the eyes 12. It will thus be seen that by releasing the cords 17 and the pins 23 and 23' from the eyes 12, the edges of the parachute are entirely free from the plane. It is therefore only necessary to place the parachute in a position in which the air may readily circulate thereunder and raise the same. This is done by a rod 26 secured to the terminal of the knife 21' and which projects through an opening in the plane. Therefore upon the upward movement of the knife 21' the rod 26 likewise moves upwardly and forces the forward edge of the parachute above the canvas strip 11, thereby permitting the air to circulate under said parachute and completely release the same.

It will clearly be understood that it is not necessary to retain the parachute in a rectangular form, but that the same may be of any suitable shape or size. It is also understood that no limited number of split pins 23 and 23' or eyes 12 are necessary.

What I claim, is—

1. In combination with an aeroplane, an auxiliary sheet of wind-proof material normally spread upon one of the planes, means for instantaneously releasing said sheet from its spread condition, and means for simultaneously lifting one portion of said sheet to admit the air therebeneath.

2. In combination with an aeroplane, an auxiliary sheet of wind-proof material normally spread upon one of the planes, strips preventing the entrance of air between said sheet and the plane, and means for instantaneously moving said sheet to a position to admit air thereunder.

3. In combination with an aeroplane, an auxiliary sheet of wind-proof material normally spread upon one of the planes, means for maintaining said sheet in taut condition, means for excluding air from between said sheet and one of the planes, and means for simultaneously rendering said last two means ineffective.

4. In combination with an aeroplane, an auxiliary sheet of wind-proof material normally spread upon one of the planes, ropes for fastening said sheet in position, strips for excluding air from beneath said sheet, a knife for cutting said ropes, and a pin operable simultaneously with said knife for pushing said sheet above said strips.

5. The combination with an aeroplane, of a parachute carried thereby, means for holding said parachute against the surface of said plane, and means for simultaneously releasing said last named means and moving said parachute to a position to receive the air.

6. The combination with an aeroplane, of a parachute normally spread and secured thereto, strips retaining the edges of said parachute, and means whereby said parachute may be released from said strips.

7. The combination with an aeroplane, of a parachute secured thereto, strips adapted to secure the edges of said parachute, means whereby the body of said parachute may be retained against the aeroplane, and means whereby said retaining means may be released.

8. The combination with an aeroplane, of a parachute secured thereto, strips adapted to secure the edges of said parachute, flexible members adapted to retain the body of said parachute against the aeroplane, and means whereby said strips and flexible members may be released.

In testimony whereof I affix my signature in presence of two witnesses.

ORSON L. PICKARD.

Witnesses:
  C. C. SHEPHERD,
  JOSEPH P. EAGLESON.